United States Patent [19]
Weber

[11] Patent Number: 4,723,727
[45] Date of Patent: Feb. 9, 1988

[54] FISHING REEL SHIFT MECHANISM

[75] Inventor: John A. Weber, Rockledge, Pa.

[73] Assignee: Penn Fishing Tackle Manufacturing Co., Philadelphia, Pa.

[21] Appl. No.: 888,465

[22] Filed: Jul. 18, 1986

[51] Int. Cl.$^4$ .......... A01K 89/00; F16H 3/08; F16D 11/04

[52] U.S. Cl. .................. 242/84.1 R; 74/333; 192/67 P

[58] Field of Search .......... 242/84.1 R, 215; 192/20, 67 P; 74/333, 670

[56] References Cited

U.S. PATENT DOCUMENTS 2,677,967  5/1954  Galbraith .......... 192/67 P
4,560,118  12/1985  Weber et al. .......... 242/215

FOREIGN PATENT DOCUMENTS 503837  12/1954  Italy .......... 242/215

Primary Examiner—Stuart S. Levy
Assistant Examiner—Thomas R. Hannon
Attorney, Agent, or Firm—Benasutti & Murray

[57] ABSTRACT

A fishing reel having shiftable concentrically-mounted gears engageable with each other via respective gear core members, with one core member of one gear having at least one perpendicular projection which is receivable by at least one well disposed in the core member of the other gear to thereby accomplish engagement of the two gears.

12 Claims, 5 Drawing Figures

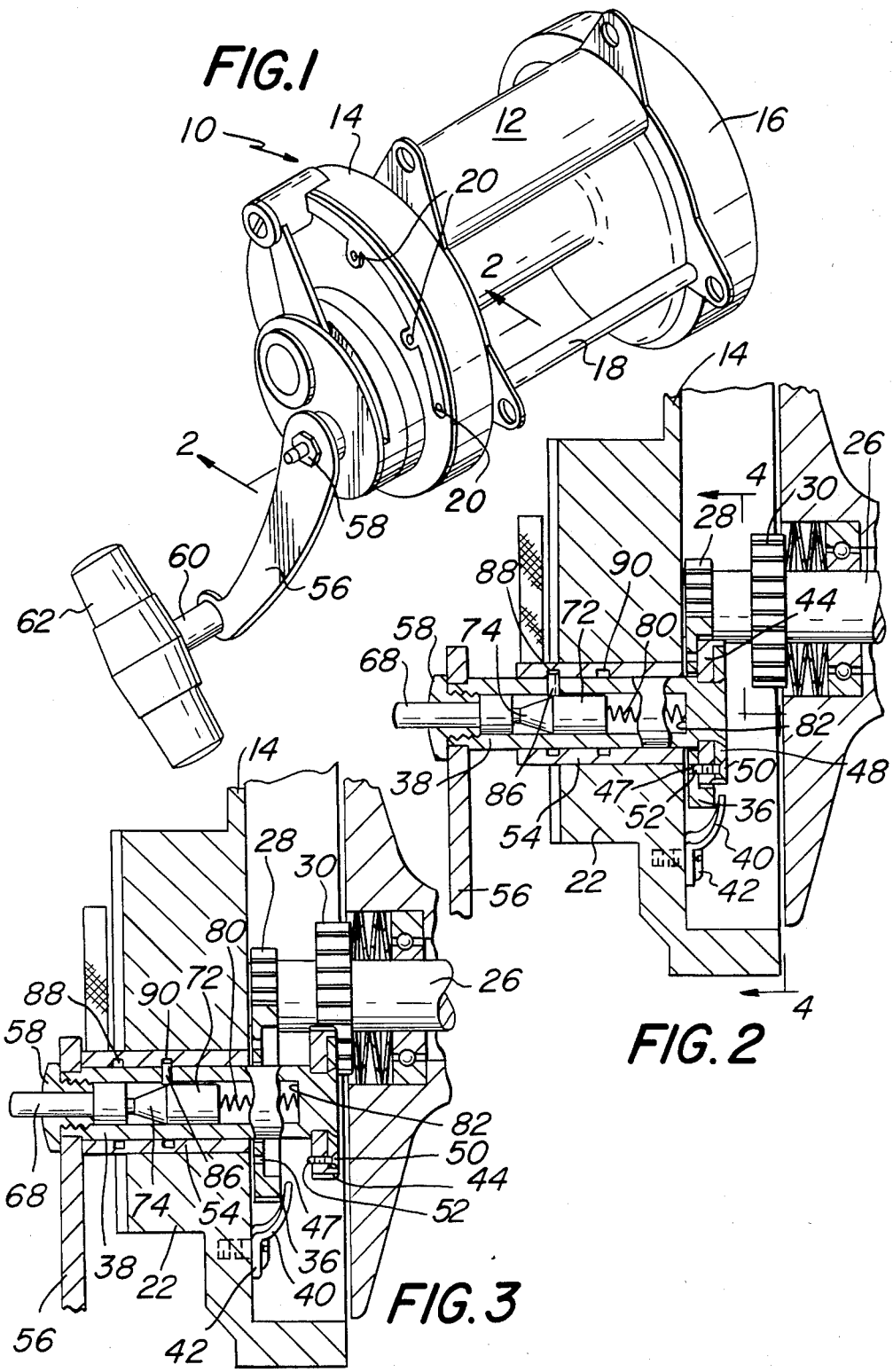

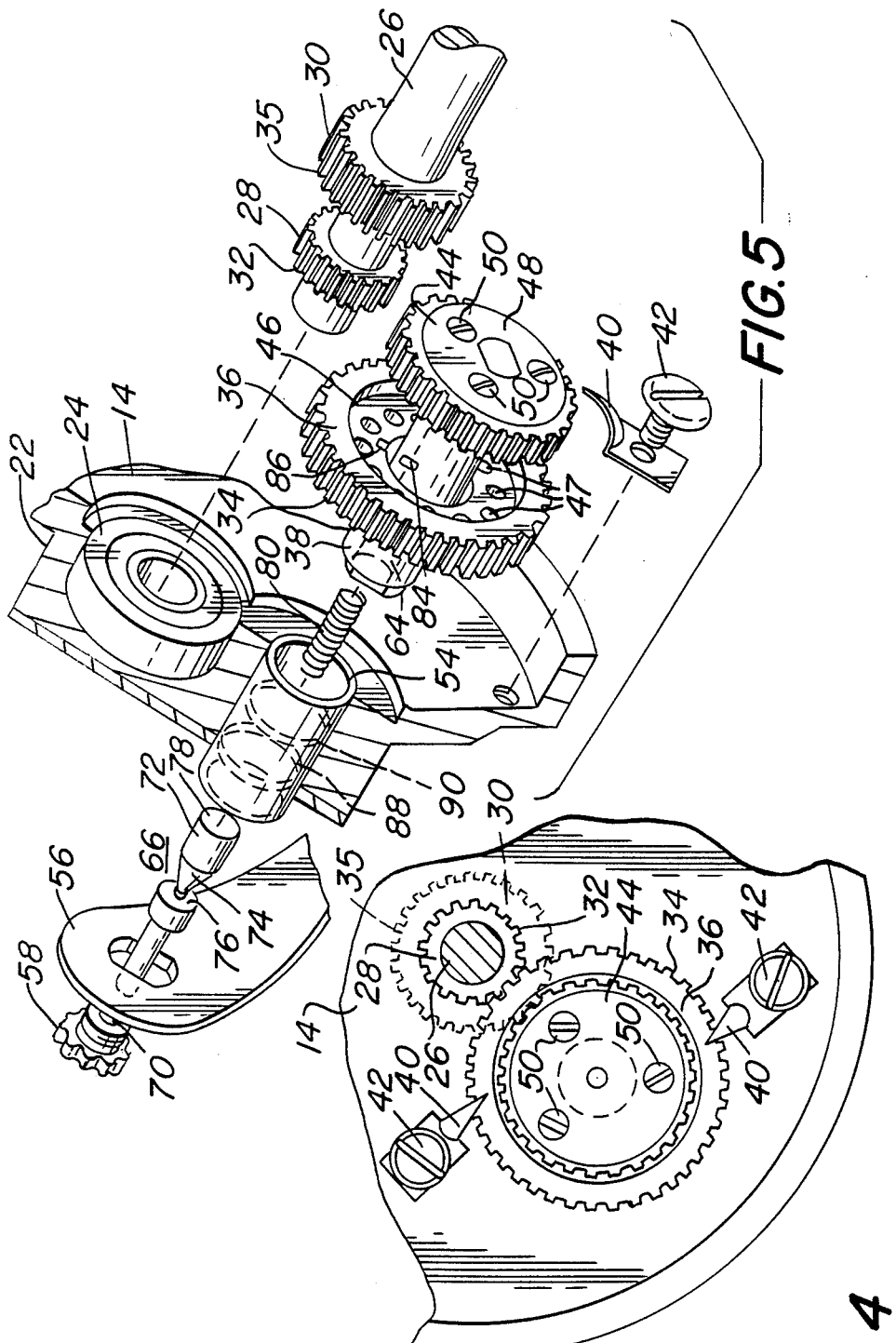

FISHING REEL SHIFT MECHANISM

BACKGROUND OF THE INVENTION

This invention relates in general to geared fishing reels, and in particular to an improved gear shifting mechanism wherein one rotatable gear can drive a second rotatable gear concentric thereto by engagement of opposing gear core members.

The importance of effective and efficient equipment in the fishing industry is well recognized. Chief among such equipment is the fishing reel which must be capable of handling a large catch while simultaneously providing ease of operation. To achieve these goals, fishing reels have been provided which have shiftable gear means that provide for the selection of spool shaft rotation velocity and power. Additionally, as described in commonly assigned U.S. Pat. No. 4,560,118 and U.S. patent application Ser. No. 757,843, filed July 22, 1985, stop means have been developed which permit cessation of spool shaft rotation at sites where gear teeth will properly mesh for shifting. In the above patent, such shiftable gearing means includes a larger ring gear having teeth on both its outside and inside surfaces. The teeth disposed on the inside surface can receive and engage teeth of a smaller-diameter, concentrically disposed gear which can then drive the ring gear. As is evident, actual gear teeth engagement must occur to effectuate ring gear drive, and, of course, disengagement must occur when such association is no longer desired. Such engagement and disengagement, while effective in providing shifting capabilities, does result in gear teeth wear and eventual adjustment or replacement of gears.

It is therefore a primary object of the instant invention to provide a fishing reel having selectively shiftable gear means wherein certain gears thereof engage with each other without gear teeth intermeshing.

Another object of the invention is to provide a fishing reel wherein such toothless engagement is effectuated by cooperating means in core plate members of respective gears.

These and other objects of the invention will become apparent throughout the description thereof which follows.

SUMMARY OF THE INVENTION

The subject of the instant invention is an improvement in a fishing reel which has spaced side plates, a crank handle, shiftable gear means for selection of spool shaft power and rotation velocity, and stop means for cessation of spool shaft rotation at sites where gear teeth of said shiftable gear means can engage. The improvement concerns cooperating gear means comprising, first of all, two adjacent, toothed gears fixedly and concentrically mounted on the spool shaft near one end thereof and adjacent a first side plate. The first gear thereof is of a lesser diameter than that of the second gear.

Secondly, the gear means comprises an axially movable and rotatable stud shaft disposed in parallel relationship with the spool shaft and having mounted at its first end a toothed distal gear whose teeth are selectively engageable with the teeth of the second gear mounted on the spool shaft, with said distal gear having a core plate member. The second end of the stud shaft is exteriorly accessible outside the first side plate for axial movement thereof to effectuate selective engagement and disengagement of the distal gear with said second gear of the spool shaft. The second end is attached to a crank handle for rotation.

Thirdly, the improvement comprises a toothed, rotatable base gear mounted on the stud shaft and retained adjacent to the side plate. The teeth of this base gear are engaged with the teeth of the first gear mounted on the spool shaft, with said base gear having a greater diameter than and concentrically disposed with the distal gear mounted on the stud shaft. The base gear also has a core plate member.

Fourthly, the improvement comprises cooperating engagement means disposed on each of the core plate members of the distal gear and the base gear for selective engagement thereof. When the plate member of the distal gear is engaged with the plate member of the base gear, the distal gear is not engaged with the second gear mounted on the spool shaft. When the plate members are so engaged, the distal gear drives the base gear upon rotation of the stud shaft, resulting in rotation of the spool shaft via the first gear mounted on said spool shaft. When the core plate members are disengaged by axial movement of the stud shaft and resultant movement of the distal gear to an engagement with the second gear mounted on the spool shaft, said spool shaft is then driven directly by the distal gear through its engagement with said second gear mounted on the spool shaft.

BRIEF DESCRIPTION OF THE DRAWINGS

FIG. 1 is a perspective view of a fishing reel which incorporates the preferred embodiment of the shift mechanism of the invention;

FIG. 2 is a vertical sectional view along line 2—2 of FIG. 1 showing the shift mechanism in one configuration;

FIG. 3 is a vertical sectional view as in FIG. 2 showing the shift mechanism in a second configuration;

FIG. 4 is a vertical sectional view along line 4—4 of FIG. 2; and

FIG. 5 is an exploded perspective view of the shift mechanism.

DETAILED DESCRIPTION OF A PREFERRED EMBODIMENT

Referring to FIGS. 1-5, a reel 10 is shown which includes a reel frame 12 with spaced side plates 14 and 16 connected by frame posts 18 and screws 20. The side plate 14 has a boss 22 with a bearing 24 carried therein, which supports a spool shaft 26 at one end thereof. The second end of the spool shaft 26 is supported within the end plate 16, having in association therewith a drive plate (not shown) which cooperates with stop means disposed within the said end plate 16. Construction and operation of said end plate 16 and drive plate are as described in U.S. Pat. No. 4,560,118, fully incorporated herein by reference.

The spool shaft 26 adjacent the bearing 24 has a smaller first gear 28 and an adjacent larger second gear 30 concentrically and fixedly mounted thereon. The gears 28, 30 have respective teeth 32, 35 extending therefrom, with the teeth 32 of the first gear 28 engaged with the teeth 34 of a side-plate retained base gear 36. The reel 10 is provided with a stud shaft 38 on which said base gear 36 is rotatably mounted. The base gear 36 is retained in juxtaposition to the side plate 14 with retainer clips 40 held in place with respective screws 42 into the side plate 14. Said base gear 36 has a recessed core plate member 46 having a plurality of wells 47 therein.

Mounted distally from the base gear 36 and at the end of the stud shaft 38 is a distal gear 44 having a core plate member 48 through which three screws 50 pass. The leading portion of each screw 50 extends through the core plate member 48 as a perpendicular projection 52 whose diameter is less than the diameter of the wells 47 in the core plate member 46 of the base gear 36 so that the perpendicular projection 52 can reside within the respective wells 47 as shown in FIG. 2.

The stud shaft 38 is axially movable and is rotatably carried in a sleeve bearing 54 carried in boss 22 of the side plate 14. Said stud shaft 38 extends exteriorly of the side plate 14 where a radial arm 56 is removably attached thereto by a threaded handle nut 58. The arm 56 has a crank rod 60 to which a knob 62 is pivotally supported for rotation of the arm 56. The stud shaft 38 has a hollow bore 64 therein which carries a positioning pin 66. Said pin 66 has an external portion 68 thereof which extends through an opening 70 in the handle nut 58; a central portion 72; a tapered portion 74; a shoulder portion 76; and an end portion 78. Said end portion 78 engages a coil spring 80 which is in contact with the inside face 82 of the stud shaft 38, urging the pin 66 to the left as seen in FIGS. 2 and 3. The stud shaft 38 additionally has a radial passageway 84 which carries a tumbler pin 86, said pin 86 being urged outwardly by the positioning pin 66 for engagement in one of the grooves 88 or 90 in the sleeve bearing 54.

To operate the reel, a user can choose between the gearing configurations as shown in FIGS. 2 and 3. Referring to FIG. 3, the distal gear 44 mounted on the stud shaft 38 is engaged with the second gear 30 mounted on the spool shaft 26. In this configuration the spool shaft 26 is directly driven by the distal gear 44 when the stud shaft 38 is rotated. Tumbler pin 86 is disposed in groove 90 to thereby maintain the position of the stud shaft 38. The configuration in FIG. 3 provides the slower spool shaft speed of the two speeds available.

Referring now to FIG. 2, the configuration there shown provides the faster of the two available speeds. A user performs the following procedure to shift from the configuration shown in FIG. 3 to that shown in FIG. 2.

First of all, the external portion 68 of the positioning pin 66 is pushed inwardly, resulting in the axial movement of the entire pin 66. The tapered portion 74 of the pin 66 becomes adjacent the groove 90 of the bearing 54 which allows the tumbler pin 86 to leave the groove 90 by gravity force.

Secondly, with the tumbler pin 86 so freed and the positioning pin 66 pushed inwardly, the stud shaft 38 is moved outwardly, by the user resulting in disengagement of the distal gear 44 from the second gear 30 mounted on the spool shaft 26. Such disengagement and movement of the stud shaft 38 further results in engagement of the base gear 36 with the distal gear 44. Specifically, the perpendicular projections 52 extending from the core plate member 48 of the distal gear 44 become seated within respective wells 47 in the core plate member 46 of the base gear 36, while the distal gear 44 itself resides in the recess of said core plate member 46. While three such evenly spaced projections 52 are here present, it is to be recognized that as few as one projection 52 can be present, or the number of projections 52 can be equal in number to the member of wells 47.

This configuration is maintained by releasing the external portion 68 of the positioning pin 66. By so doing, the entire pin 66 moves outwardly, under pressure from the spring 80, forcing the tumbler pin 86 to move into the groove 88 for ultimate configuration maintenance. The distal gear 44 now drives the base gear 36, via the projections 52 disposed in the wells 47, with said base gear 36 being in engagement with the first gear 28 of the spool shaft 26. To return to the gear engagement shown in FIG. 3, a user simply reverses the above procedure.

The cooperating engagement between respective core plate members 46, 48 of the base gear 36 and distal gear 44 accomplish engagement of said gears without the employment of gear teeth. As a result, the normal wear between such gear teeth does not occur, thereby resulting in longevity of shift operation. Further, if the perpendicular projections 52 are removable as shown in the preferred embodiment, any such projection 52 which becomes worn over time can be easily removed and replaced without requiring the replacement of an entire gear. The shift ability thus produced is efficient, smooth, and dependable.

It is to be understood that the above described preferred embodiment is meant to be illustrative and not limiting, and that the scope of the invention is defined in the claims which now follow.

What is claimed is:

1. In a fishing reel having spaced side plates, an exteriorly disposed crank handle, shiftable gear means for selection of spool shaft power and rotation velocity, and stop means for cessation of spool shaft rotation at sites where gear teeth of said shiftable gear means can engage with each other, wherein the improvement comprises:

(a) two adjacent, toothed gears fixedly and concentrically mounted on a spool shaft near one end thereof and adjacent a first side plate, wherein the first gear thereof is of a lesser diameter than that of the second gear;

(b) an axially movable and rotatable stud shaft disposed in parallel relationship with said spool shaft and having mounted at its first end a toothed distal gear whose teeth are selectively engageable with the teeth of the second gear mounted on said spool shaft, with said distal gear having a first core plate member, and further wherein the second end of said stud shaft is exteriorly accessible outside said first side plate for rotational movement by the crank handle and for axial movement thereof to effectuate selective engagement and disengagement of said distal gear with said second gear of said spool shaft;

(c) a toothed, rotatable, stud shaft mounted base gear mounted proximally from the distal gear and retained adjacent said first side plate, wherein the teeth of said base gear are engaged with the teeth of said first gear mounted on said spool shaft, said base gear having a greater diameter than and concentrically disposed with said distal gear and having a second core plate member; and (d) cooperating engagement means disposed on each of said first and second core plate members of said distal gear and said base gear for selective engagement thereof with each other such that said distal gear can nestingly engage said base gear and said spool shaft is driven by engagement of said first gear with said engaged base and distal gears.

2. A fishing reel as claimed in claim 1 wherein said core plate member of said base gear is recessed to accept said distal gear nestingly within said recess.

3. A fishing reel as claimed in claim 1 wherein said cooperating engagement means disposed on said first and said second core plate members comprises at least one perpendicular projection extending from one core plate member and at least one well in the other core plate member wherein a said perpendicular projection can reside.

4. A fishing reel as claimed in claim 3 wherein said core plate member of said base gear is recessed to nestingly accept said distal gear within said recess.

5. A fishing reel as claimed in claim 3 wherein said cooperating engagement means comprises a plurality of individual perpendicular projections and a plurality of individual wells at least equal in number to the number of perpendicular projections, said wells being spatially arranged to respectively simultaneously accommodate all said perpendicular projections.

6. A fishing reel as claimed in claim 5 wherein said core plate member of said base gear is recessed to nestingly accept said distal gear within said recess.

7. A fishing reel as claimed in claim 3 wherein said perpendicular projection is removablly mounted on said core plate from which it extends.

8. A fishing reel as claimed in claim 1 wherein said stud shaft has cooperating releasable retainment means wherein axial movement of said stud shaft to a site of selected gear engagement is thereafter releasably maintained.

9. A fishing reel having spaced side plates, an exteriorly disposed crank handle, shiftable gear means for selection of spool shaft power and rotation of velocity, and stop means for cessation of spool shaft rotation at sites where gear teeth of said shiftable gear means can engage with each other, wherein the improvement comprises;

(a) two adjacent, tooth gears fixedly and concentrically mounted on a spool shaft near one end thereof and adjacent a first side plate wherein the first gear thereof is of a lesser diameter than that of the second gear;

(b) an axially movable and rotatable stud shaft disposed in parallel relationship with said spool shaft and having mounted at its first end a tooth distal gear whose teeth are selectively engageable with the teeth of said second gear mounted on said spool shaft, with said distal gear having a first core plate member, and further wherein the second end of said stud shaft is exteriorally accessible outside said first side plate for rotational movement by the crank handle and for axial movement thereof to effectuate selective engagement and disengagement of said distal gear with said second gear of said spool shaft;

(c) a tooth, rotatable, stud shaft mounted base gear mounted proximally from the distal gear and retained adjacent said first side plate wherein the teeth of said base gear are engaged with the teeth of said first gear mounted on said spool shaft, said base gear having a greater diameter than and concentrically disposed with said distal gear and having a recessed second core plate member to nestingly accept said distal gear within said recess;

(d) cooperating engagement means comprising at least one perpendicular projection on said first core plate member and at least one individual well on said second core plate member wherein the perpendicular projection can reside in said well for selective engagement between said distal gear and said base gear such that said distal gear can nestingly engage said base gear and said spool shaft is driven by engagement of said first gear with said nestingly engaged base and distal gears.

10. A fishing reel as claimed in claim 9 wherein said cooperating engagement means comprises a plurality of individual perpendicular projections on said first core plate member and a plurality of individual wells on said second core plate member equal to or greater in number than the number of perpendicular projections, said wells being spacially arranged to respectively simultaneously accommodate said perpendicular projections when said distal gear is nested in said recess of said base gear core plate member.

11. A fishing reel as claimed in claim 9 wherein said perpendicular projections are removable from said core plate member from which they extend.

12. A Fishing reel as claimed in claim 9 wherein said stud shaft has cooperating releasable retainment means wherein axial movement of said stud shaft to a site of selected gear engagement is thereafter releasably maintained.

* * * * *